United States Patent [19]

Youcha

[11] Patent Number: 4,509,502
[45] Date of Patent: Apr. 9, 1985

[54] MULTIPLE LENS COVER FOR SOLAR HEATING PANEL

[76] Inventor: Jack Youcha, 100 Elm Dr., Levittown, N.Y. 11756

[21] Appl. No.: 441,453

[22] Filed: Nov. 15, 1982

[51] Int. Cl.³ ............................................. F24J 3/02
[52] U.S. Cl. .................................... 126/440; 126/449
[58] Field of Search ............... 126/426, 440, 450, 449, 126/415, 417; 350/258, 259, 409, 252, 254; 4/498, 499, 503; 52/80

[56] References Cited

U.S. PATENT DOCUMENTS

| 3,986,491 | 10/1976 | O'Hanlon | 126/440 X |
| 4,057,048 | 11/1977 | Maine | 126/440 |
| 4,077,393 | 3/1978 | Mattson | 126/440 X |
| 4,098,263 | 7/1978 | Lanciault | 126/440 |
| 4,136,670 | 1/1979 | Davis | 126/440 |
| 4,188,941 | 2/1980 | Hopkins | 126/440 |
| 4,299,201 | 11/1981 | Tsubota | 126/440 |
| 4,341,201 | 7/1982 | Ziemann | 126/440 |
| 4,341,204 | 7/1982 | Bloxsom | 126/440 |

FOREIGN PATENT DOCUMENTS

| 2617605 | 11/1977 | Fed. Rep. of Germany | 126/440 |
| 2712913 | 10/1978 | Fed. Rep. of Germany | 126/440 |
| 2819989 | 11/1979 | Fed. Rep. of Germany | 126/440 |
| 34058 | 4/1981 | Japan | 126/440 |
| 46947 | 4/1981 | Japan | 126/440 |
| 146954 | 11/1981 | Japan | 126/440 |
| 151844 | 11/1981 | Japan | 126/441 |

Primary Examiner—Margaret A. Focarino
Attorney, Agent, or Firm—Nolte, Nolte and Hunter

[57] ABSTRACT

A transparent cover for a solar panel has a number of uniform undulations or ridges across its surface. The cover is formed of a plurality of lens elements arranged over the entire surface of the cover and at specific angles along the ridges. The lenses focus and intensify the incident solar radiation onto the thermal collector elements of the panel.

1 Claim, 4 Drawing Figures

MULTIPLE LENS COVER FOR SOLAR HEATING PANEL

BACKGROUND OF THE INVENTION

The present invention relates in general to a transparent cover for a solar heating panel and, specifically, relates to a transparent cover sheet integrally formed with a plurality of lenses that serve to focus, magnify, and intensify the solar radiation onto the heat absorbing elements of the panel.

The use of solar panels to heat fluids by solar radiation has become exceedingly popular and the attendant technology has become more and more refined. The solar panels typically employ thermal collectors formed of metal plates and tubes or extrusions upon which the solar radiation falls and through which the fluid to be heated passes. These collectors are sealed from the weather by transparent covers formed of a plate-like glazing, such as conventional glass window panes, Plexiglas, or the like. The principal purpose is to provide a transparent surface that protects the collector tubes from the elements, yet permits the solar radiation to pass through and fall on the heat collecting elements inside the solar panel.

The typical solar panel is preferably installed with a Southern exposure at a predetermined angle and then fixed to the roof. This is an attempt to maximize the amount of solar radiation received by the panel, however, in order truly to maximize the solar radiation falling on the panel the best approach is to mount the solar panel on some pivotable means, so that the panel can track the sun through its apparent traverse of the sky. Needless to say, such solar panel tracking systems are so expensive, cumbersome, and overly complex as to be prohibitive to the homeowner.

SUMMARY OF THE INVENTION

The present invention provides an undulated transparent cover for a solar heating panel that is formed having a plurality of integral lens elements arranged at specific angles on the surfaces of the ridges. The lens elements serve to focus and intensify the solar radiation falling on the internally arranged heat collecting elements of the panel. The inventive lens cover is not a flat planar sheet but, rather, has a rippled or undulated surface with the lenses being arranged in longitudinal rows on this rippled surface parallel to the undulations. In this way, a fixed proportion of the total number of lenses will be directly facing the sun, as it apparently traverses the sky during the day. That is, the solar rays will always be aligned with the axis of at least some of the collecting lenses forming the inventive lens cover.

The multiple lens cover can be installed as original equipment on new solar panels or can be retrofit to existing panels by removing the existing transparent cover and installing the inventive cover. Because the multiple lens cover intensifies the solar radiation on the collecting elements, each solar panel produces more available thermal energy so that fewer panels are required per installation.

Accordingly, it is an object of the present invention to provide a transparent cover for a solar heat panel that focuses and intensifies the solar radiation incident upon the panel, so as to improve the efficiency of the heat collecting elements of the panel.

The manner in which this and other objects are accomplished by the present invention will be set forth in the following detailed description of the invention.

DETAILED DESCRIPTION OF THE INVENTION

Figure 1:
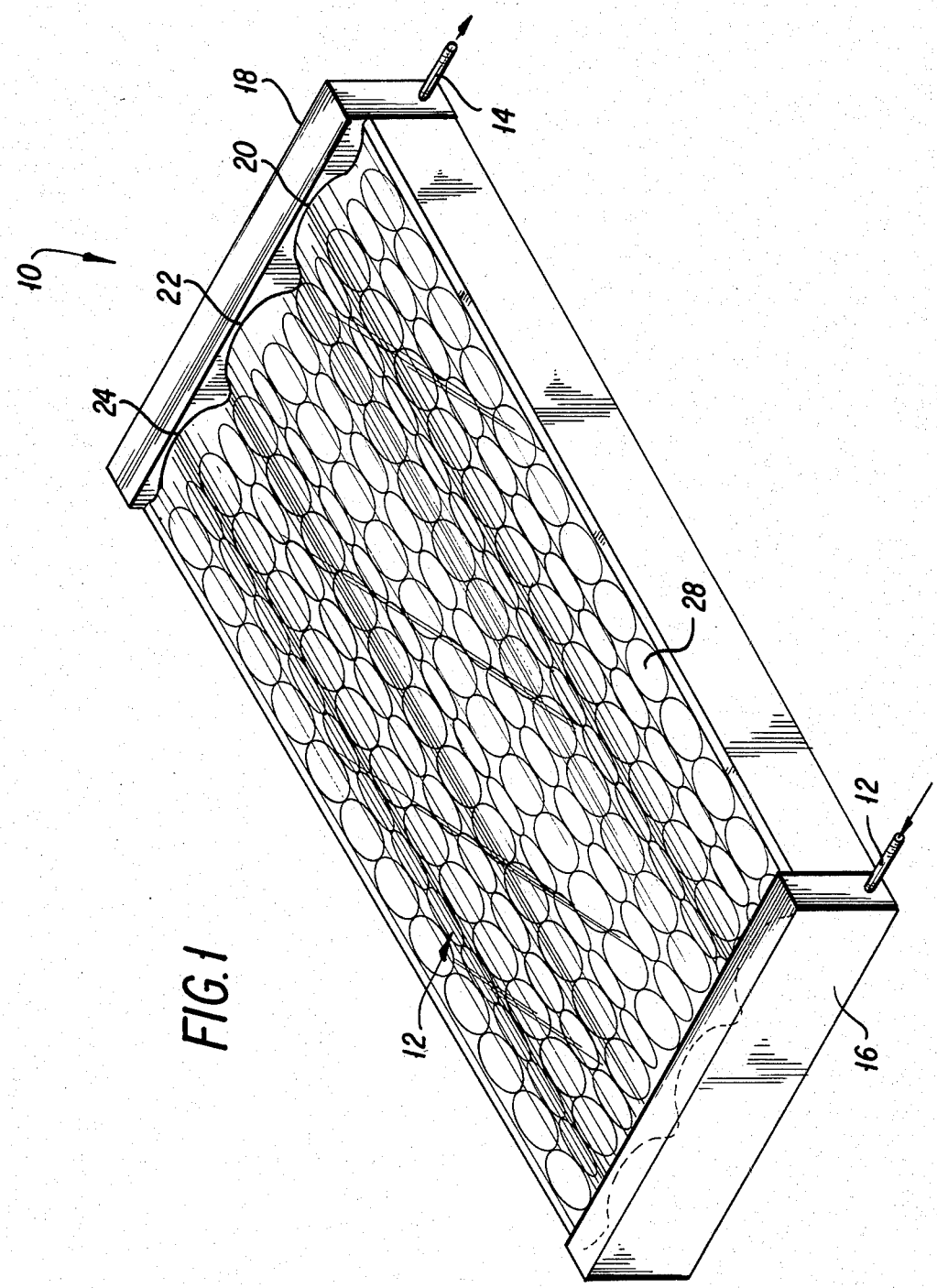
FIG. 1 is a perspective of the inventive multiple lens solar panel cover.

Referring now to FIG. 1, a typical solar panel 10 is shown having the inventive multiple lens cover 12 installed thereon. This kind of solar heat collector usually has a plurality of fluid containing tubes, not seen in FIG. 1, which are connected to appropriate fluid inlet and outlet conduits, 12 and 14, respectively, by headers or manifolds 16, 18. The fluid tubes may be covered by, and thermally connected to, metal plates. The inventive multiple lens cover has a number of periodic ridges, undulations, or waves, and in this embodiment three such ridges are shown at 20, 22, 24 in FIG. 1. Arranged on each of these three ridges are three rows of individual lens elements, with an additional row arranged in the transitional "valley" between adjacent ridges. Each lens element is identical, with one such lens being indicated typically at 28. The lens elements 28 focus and intensify all solar radiation incident thereon, and particularly at three particular locations in the sun's apparent traverse of the sky on the internally arranged collector elements that absorb the heat from the sun.

The lens elements should be collecting or positive lenses, typified by any of the common lenses, such as biconvex, plano-convex, or positive meniscus.

Figure 2:
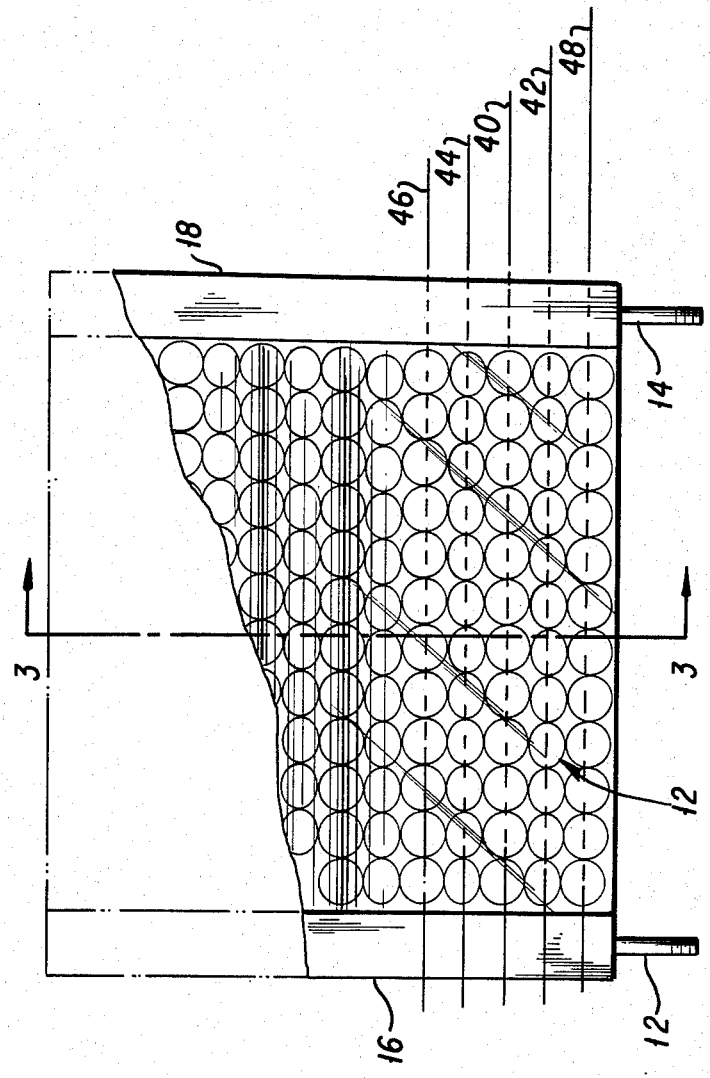
FIG. 2 is a top plan view of the inventive multiple lens solar panel cover.

Referring now to FIG. 2, the specific arrangement of the individual lens elements in the rippled or undulated cover may be seen more clearly, since FIG. 2 is a top plan view of the assembly of FIG. 1. The alignment and number of lenses, which make up each undulation or ripple in the plate assembly, is shown specifically. The dashed line 40 represents the alignment of the centers of those lenses arranged at the top of one of the ridges. This line of lenses serves to focus the solar radiation at midday, i.e., when the sun is substantially overhead. This assumes that the solar panel is flat on the ground, however, in practice since the solar panel will be slanted with respect to the ground so that the midday position corresponds to the time when the sun lies on a line drawn perpendicular to the overall surface of the panel. At such time, the vertical rays would be aligned with the axes of those lenses arranged along dashed line 40. The lenses whose centers are aligned with dashed line 42 are arranged along one side or wall of the ridge and have their central axes at substantially a 45° angle, with respect to the axes of the lenses arranged along line 40. Similarly, those lenses whose centers are arranged along dashed line 44 are on the opposite side of the ridge from the lenses on line 42 and also are arranged with their axes at a 45° angle with respect to the vertical, or the axes of the top lenses arranged along dashed line 40. The angle subtended by the axes of the two angularly arranged lenses, shown generally at 42 and 44 is 90°.

The transition zones between the successive raised ridges also have a plurality of lenses arranged therein. Dashed line 46 represents a row of these transition zone lenses. The axes of these lenses are parallel to the axes of the lenses arranged along the top of the ridges, as shown by dashed line 40. Similarly, transition areas are located on the outside edges of the cover 12 and lenses are again placed in these zones and arranged with their axes parallel to the axes of the uppermost lenses along line 40, as well as with the transition zone lenses along line 46. One such outer row is represented by dashed line 48. This arrangement then proceeds for as many periodic repetitions as required to cover the surface of the solar panel.

Figure 3:
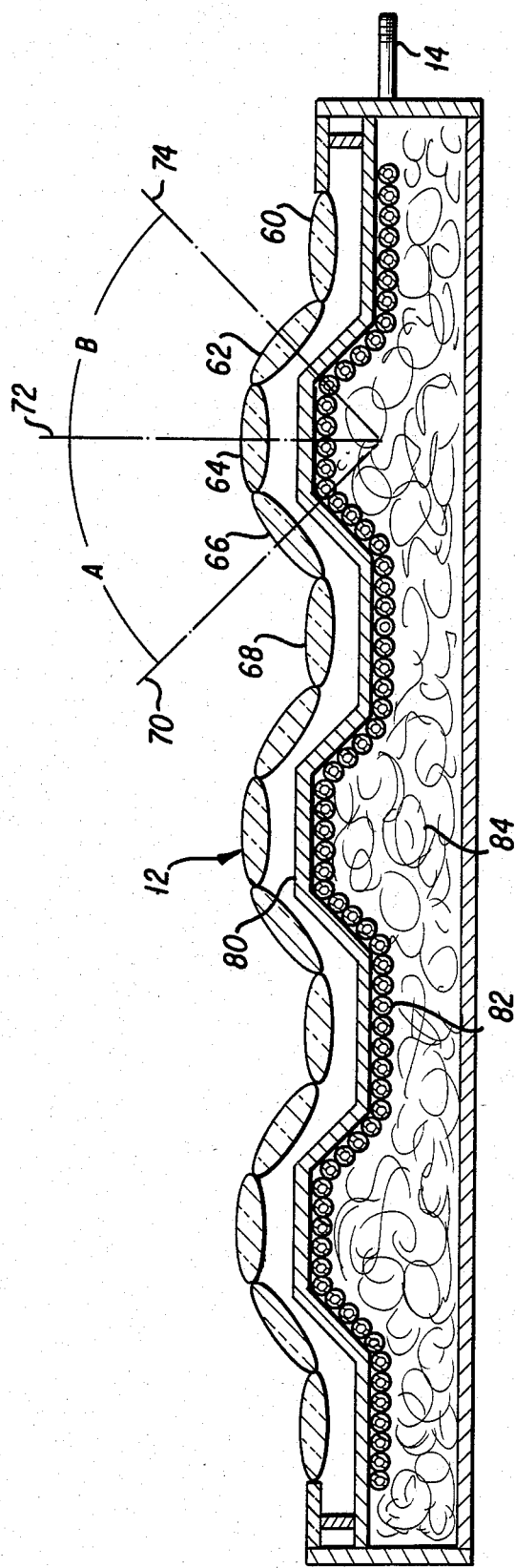
FIG. 3 is a side elevational view in cross section, taken along section lines 3—3 in FIG. 2.

FIG. 3 is a side elevational view, in cross section, taken along section lines 3—3 of FIG. 2 and shows the arrangement of the individual lens elements as they form the undulations in the sheet. Specifically, one of the lenses forming the outer transition zone 48 in FIG. 2 is shown in cross section at 60, one of the lenses in the slanted or side row, such as row 44 in FIG. 2, is shown in cross section at 62. One of the lenses in the uppermost row, as shown at 40 in FIG. 2, is seen in cross section at 64, and the other slanted row lens, on line 42 in FIG. 2, is seen in cross section at 66. The transition lens on line 46 of FIG. 2 is seen in cross section at 68.

The specific angular arrangement between the axes of the three different angularly arranged lenses is shown in FIG. 3. Specifically, the angle between axis 70 of lens 66 and axis 72 of lens 64 is represented as A, and in the present embodiment this angle equals approximately 45°. Similarly, the angle between axis 74 of lens 62 and axis 72 of lens 64 is represented as B and, in this embodiment, also equals 45°. The total subtended then being 90°.

The embodiment of FIG. 3 employs a ridged metal plate 80 as an element of the collector for the solar radiation. This plate 80 is preferably formed of aluminum, or other metal having a high thermal conductivity, with a matte black finish and is arranged in intimate contact with a plurality of fluid conduit tubes shown typically at 82. The water or other fluid is heated as it passes through these tubes 82 and the solar radiation that has been focused and intensified by the inventive multiple lens cover onto the various flat surfaces of the heat absorbing plate 80 is transferred through plate 80 to tubes 82 to heat the fluid. The water or other fluid in tubes 82 flows in the appropriate direction, i.e., either in or out of the conduits 12 and 14, as determined by other apparatus in the solar heating system. In this embodiment some form of insulation 84 is arranged inside the solar panel around the tubes 82 to prevent the heat absorbed by the tubes from being lost.

The multiple lens cover 12 of the present invention is formed of lenses that are clear or transparent to solar radiation, as is the matrix in which the lenses are arranged, but they are substantially opaque to long wavelength radiation that might be produced by the metal collector assembly. The solar radiation that provides the heat is essentially made up of shorter wavelengths passes through the lens plate and impinges on the collector surface, yet the heat radiated from the collector surface would be longer wavelength radiation that will not pass easily back through the lens plate 12.

The cover in the present invention containing the multiple lenses may be formed of molded glass as a single piece or as long strips fastened together, or the cover may be similarly formed of molded plastic. The present invention also contemplates forming the individual lens elements of glass and imbedding them in a transparent plastic matrix. In any event, the cover should be formed so that each lens contacts all adjacent lenses, in order to maximize the lens surfaces available and to minimize the amount of interconnecting or matrix material required.

Figure 4:
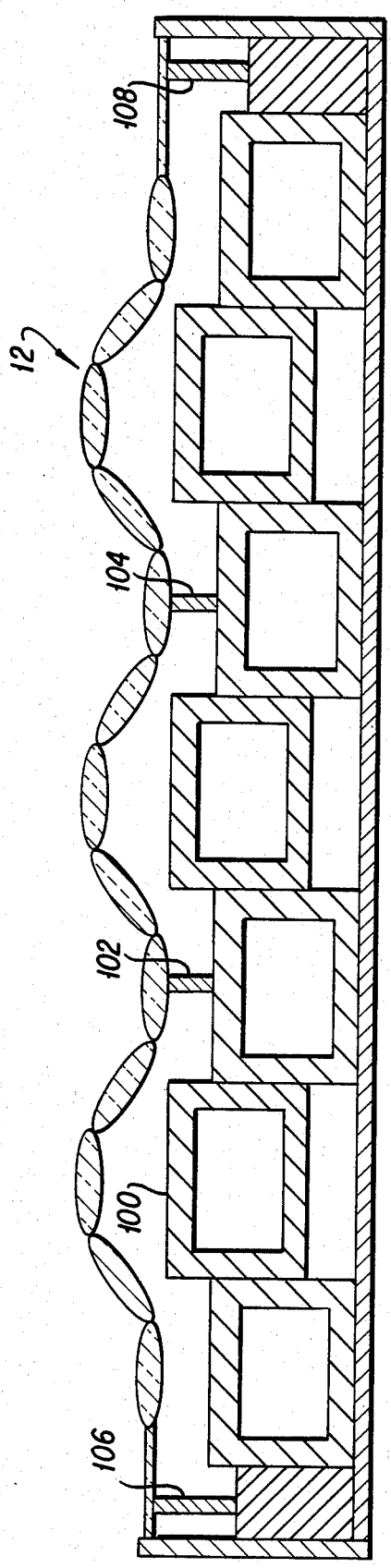
FIG. 4 is a side elevational view in cross section, showing the present invention in use with an alternate kind of heat collecting assembly.

FIG. 4 shows the use of the inventive multiple lens solar panel cover being used with a solar panel, having a different kind of collector assembly specifically, one formed of a number of box-like extrusions, typically made from aluminum. In other words, instead of the angled-surface plate 80 and the plurality of pipes 82, as shown in the embodiment of FIG. 3, the solar heat collector employs a number of elongate, box-like extrusions, shown typically at 100. The present invention also operates advantageously with this kind of solar collector and, as may be seen, the undulations of the cover follow generally the outline of the collector assembly. In this embodiment, supports 102 and 104 are employed and these supports, in conjunction with the end supports 104, 108, determine the spacing between the inventive cover 12 and the collector elements 100. By varying the height of these supports or spacers 102, 104, 106 and 108 the desired temperature may be obtained at the heat collector surface. It should be noted that the present invention provides a quite efficient focusing and intensifying of the radiation onto the collector elements and, thus, it is possible that the collector elements may overheat. In order to preclude this, and to control the heat produced, the length of elements 102, 104, 106, and 108 are chosen specifically. This spacing applies to the embodiment of FIG. 3 as well.

It is understood that the foregoing is presented by way of example only and is not intended to limit the scope of the present invention, except as set forth in the appended claims.

I claim:

1. A cover for use with a solar panel, comprising a sheet of transparent material having periodic undulations forming parallel elongate upraised ridges, each said ridge having a top and sides and a valley extending between adjacent ridges in the surface thereof, and a plurality of solar heat collecting lens means integrally formed in said sheet and being arranged substantially over the entire surface of said sheet, said lens means being arranged substantially in longitudinal rows aligned with said ridges, whereby said lens means focus and intensify incident solar radiation onto heat collecting elements of the solar panel, said solar heat collecting lens means being arranged in three rows along each of said elongate upraised ridges, one of said rows of lens means being arranged on the top of said ridge, and a row of lens means being arranged along each side of said elongate upraised ridge, each lens means being formed as a substantially circular lens substantially contiguous to its next adjacent circular lenses, each lens having a central axes, and wherein said lenses arranged along the sides of said upraised ridges are arranged at angles such that the angle subtended by the central axes of said two side rows is 90°.

* * * * *